United States Patent Office
3,770,663
Patented Nov. 6, 1973

3,770,663
PRODUCTION OF FOAMED BEADS
Shiro Ueki, Tadayuki Fukuda, and Yoshimitsu Miyata, Yokkaichi, Japan, assignors to Kabushiki Kaisha Oji Yuka Goseishi Kenkyujo, Tokyo-to, Japan
No Drawing. Filed Nov. 2, 1971, Ser. No. 195,051
Int. Cl. C08j 1/14
U.S. Cl. 260—2.5 B
9 Claims

ABSTRACT OF THE DISCLOSURE

A dispersion of crystalline polymer particles in a medium is held in a high-pressure region at a pressure above the saturate vapor pressure of the dispersion and at a temperature below the melting point of the polymer and of a value at which crystallization of the polymer progresses thereby to cause infiltration of the dispersion medium into the polymer particles due to volumetric shrinkage of the polymer accompanying crystallization thereof and thereby to form a dispersion of foamable polymer particles, and this dispersion is ejected from the high-pressure region into a low-pressure region at a pressure below the saturated vapor pressure of this dispersion and at a temperature lower than the melting point of the polymer.

BACKGROUND

This invention relates generally to polymers and structures made therefrom and more particularly to a novel and advanced process for producing foamed beads having uniform cells from crystalline polymers.

The process for producing foamed beads by applying the heat-foaming conditions of a foaming agent to a polymer impregnated with this foaming agent is known.

In the case of a polyolefin polymer, however, the drop in melt viscosity at the time of the heating is excessively rapid, and, moreover, the value of the melt viscosity, itself, is extremely low. Consequently, containment of the generated gas becomes insufficient in the case where a conventional physical or chemical blowing agent is used, and foamed beads having a satisfactory cellular structure cannot ever be produced.

The phenomenon of the formation of vacuum holes within a crystalline polymer mass when this polymer in a molten state is cooled and solidified is known. This phenomenon arises from conditions such as the extremely small specific volume of the crystalline polymer in cooled state as compared with that in molten state and the extremely low thermal conductivity of the polymer.

This phenomenon is the cause of various porduct quality defects such as sink marks, cavities, cracks, and fissures (hereinafter referred to collectively as "voids") in sheets and injection molded articles, particularly thick-walled articles, of crystalline polymers. Accordingly, various expedients and measures are resorted to prevent the occurrence of this phenomenon, that is, the formation of vacuum holes.

We have made the interesting and useful discovery that when this phenomenon is caused to occur in a dispersion under pressure of particles of a crystalline polymer in a liquid foaming agent used as a dispersion medium, a large quantity of the liquid foaming agent, used as the dispersion medium of the dispersion, is introduced into the interiors of the polymer particles, and when this dispersion is subjected to a "flash" decompression or sudden release of pressure, foamed beads having a fine, uniform cell structure are produced. We have found further that this desirable result is attainable particularly in the case of polyolefin polymers.

SUMMARY

It is an object of this invention to utilize our findings to overcome the aforedescribed difficulty in providing a process for producing foamed beads of crystalline polymers, particularly polyolefin polymers.

More specifically, we have found that this object can be achieved by utilizing the foaming action due to evaporation in a low-pressure region of a non-solvent relative to a polymer introduced into the interior of the polymer particles in a high-pressure region by utilizing the volumetric shrinkage of the polymer accompanying the crystallization thereof.

According to this invention, briefly summarized, there is provided a process for producing foamed beads in which (1) a dispersion of particles of a crystalline polymer in a medium is held in a high-pressure region at a pressure above the saturated vapor pressure of the dispersion and at a temperature lower than the melting point of the polymer and within the range of temperatures at which crystallization of the polymer progresses thereby to cause infiltration of the dispersion medium into the polymer particles due to volumetric shrinkage of the polymer accompanying crystallization thereof and thereby to form a dispersion of particles of foamable crystalline polymer, and (2) this dispersion is ejected from the high-pressure region into a low-pressure region at a pressure lower than the saturated vapor pressure of this dispersion and at a temperature lower than the melting point of the polymer thereby to produce foamed beads. The foamed beads produced in accordance with this invention are useful in the fields where foamed polymer beads are used.

The nature, utility, and further features of this invention will be apparent from the following detailed description beginning with a consideration of general aspects of the invention and concludig with specific examples of practice illustrating preferred embodiments thereof.

DETAILED DESCRIPTION

Crystalline polymer

The polymers to which this invention is applicable are crystalline polymers in general. While the polymer as used in the invention is subject in the form of a dispersion to pressurization and heating in many instances, it may be said that, in the case where the dispersion medium contains water, polymers prepared by poly-addition are preferable to those prepared by polycondensation, if a choice is to be made, in consideration of the possibility of occurrence of hydrolysis.

Specific examples of crystalline polymers of this character are polyolefin resins, particularly homopolymers and mutual copolymers of ethylene, propylene, and butene-1 and copolymers, wherein these monomers are prodominant, of these monomers and other monomers copolymerizable therewith such as vinyl acetate, and acrylate, polychloroethylene resins, polyamide resins, polyester resins, and polyacetal resins, either singly or as a copolymer in each case.

Of these examples of polymers, the most representative are polyolefin resins, of which isotactic polypropylenes and high-density polyethylenes are the most typical. These polymers can be used singly or as a mixture thereof.

Filler

In the process of this invention, the above described polymer is crystallized under pressure in the state of a dispersion of its particles, whereby the dispersion medium is forced to penetrate into the interior of the polymer particles. For greater facility of this infiltration of the dispersion medium, it is preferable that the polymer particles be heterogeneous.

To render the crystalline polymer particles heterogeneous, an organic or inorganic filler which is not mutually soluble with the objective polymer is admixed therewith. That is, when a filler is admixed with the crystalline polymer, the boundary surfaces between this polymer and the filler are in an easily peeled state because, in general, the coefficients of expansion and contraction of these constituents are mutually different. Consequently, the shrinkage stresses due to the volumetric shrinkage at the time of crystallization of the crystalline polymer act in a concentrated manner on these boundary surfaces, whereby voids are much more easily formed than in the case of the crystalline polymer used without the filler. We have found further that voids can be formed with even greater uniformity by dispersing the filler uniformly within the polymer.

Examples of fillers suitable for use according to this invention are inorganic and organic powders generally usable as fillers for polymers. Specific examples of these fillers are clays, calcium carbonate, diatomaceous earth, Fuller's earth, silica, calcium sulfate, magnesium carbonate, magnesium oxide, magnesium hydroxide, magnesium sulfate, talc, alumina, barium sulfate, powders of resins, such as phenoplasts and aminoplasts and powders of petroleum resins. These fillers may be those which are soluble in the dispersion medium or which adsorb or absorb the medium.

Furthermore, these fillers may be those which react with the dispersion medium which has infiltrated to generate a gas within the crystalline polymer particles, for example, carbonates in cases where the dispersion mediums are aqueous solutions of acids of greater dissociation constant than carbonic acid or mixtures of carbonates and hydrolyzable salts of strong acids and weak bases in cases where the dispersion medium is water. These filers should be in the form of very fine particles, for example, of particle size of less than approximately 20 microns, preferably less than a few microns, or of particles of complex shapes having large surface areas.

Examples of other suitable fillers are polymers which are kneadable but not mutually soluble with the crystalline polymer. These filler polymers per se may be crystalline or non-crystalline and may be soluble in the dispersion medium. Examples of these filler polymers are polystyrenes, polyvinylalcohol, polyethylene oxide, polyacrylic acid and functional derivatives thereof, polyvinylpyrolidone, and gum arabic.

These fillers may, of course, bu used in combination. The admixing quantities of a filler is of the order of from 10 to 70 percent, preferably from 30 to 50 percent, of the weight of the crystalline polymer.

The crystalline polymer used in accordance with this invention may contain any of the additives generally used in polymers, such as a stabilizer against oxidation, foaming agent, cross-linking agent, and coloring agent, in addition to a filler of the above described character.

DISPERSION OF CRYSTALLINE POLYMER PARTICLES

A crystalline polymer prepared in the above described manner is dispersed or suspended in particulate form in a disperesion medium. The articles ordinarily range in size from powder grains to pellets or lumps.

Since the crystalline polymer is subjected to a heat treatment to promote crystallization, its degree of crystallinity should be amply low, as described in detail hereinafter.

One example of a dispersion medium in which the crystalline polymer particles are to be dispersed is water. For this water, aqueous solution of acids, bases, salts, polymers, and other substances may be used in addition to pure water.

Another example of a suitable dispersion medium is an organic solvent. As long as it is a dispersion medium, this organic solvent is substantially a non-solvent with respect to the crystalline polymer under the conditions to which the medium is to be exposed, particularly the conditions of the high-pressure region for promoting crystallization.

Furthermore, since this organic solvent is to infiltrate into the interiors of the crystalline polymer particles within the dispersion and to function as a foaming agent at the time the suspension is extruded into a low-pressure region, it is desirable that this solvent have a sufficiently low boiling point, for example, lower than 100° C. If this boiling point is higher than 100° C., the explosive expansion force from the interior and exterior of the polymer particles at the time the dispersion is subjected to an abrupt pressure release will be small, and satisfactory cooling and solidification of the crystalline polymer will not be possible. Moreover, the polymer particles cannot be foamed sufficiently with uniformity. Furthermore, the problem of the solvent remaining as a residue also arises.

Examples of suitable organic solvents are alcohols, ketones, and ethers, which may be used singly or as mixtures thereof. The use of an organic solvent admixed with water is also possible.

In order to facilitate the wetting of the polymer particles by the dispersion medium or the infiltration of the medium into the polymer particles, it is also possible to use a small quantity of a surfactant, or an organic solvent or positive solvent which causes the polymer to dissolve or swell. An example of a suitable surfactant is an emulsifier of the type generally sold on the market. An example of a suitable positive solvent is any solvent exhibiting positive characteristics as described above in the high-pressure region. Both a surfactant and a positive solvent can be used together.

Other materials of arbitrary nature may exist within the dispersion provided that they do not impair the effectiveness and advantageous features of this invention and are not counter to the spirit thereof.

The concentration of the crystalline polymer containing the filler blended therefith in the dispersion is of the order of from 5 to 70 percent, particularly from 30 to 50 percent, of the weight of the dispersion.

HEAT TREATMENT (CRYSTALLIZATION)

In accordance with this invention, the dispersion of the crystalline polymer particles as described above is heat treated in a high-pressure region. More specifically, the crystallization of the crystalline polymer is caused to progress as the dispersion is maintained at a pressure above the saturated vapor pressure thereof and at a temperature below the melting point of the objective polymer and of a value at which the crystallization proceeds.

Since crystallization is carried out in this heat treatment step to cause voids to be formed in the polymer particles, the crystalline polymer to be subjected to this process step must, of course, be in a state of low degree of crystallinity wherein crystallization can progress. Furthermore, since a large increase in the degree of crystallinity in this process step is advantageous for the formation of voids, it is desirable that the polymer to be thus heat treated be in a state of minimum degree of crystallinity, preferably in an amorphous state.

To assure that the polymer to be heat treated will be in this state of low crystallinity, the polymer particles to be dispersed in the dispersion medium are preferably prepared by rapid cooling from a molten stage. By projecting the molten polymer directly into the dispersion medium in this preparation step, it is possible to eliminate the possibility of drawing in of air due to the formation of voids which may occur in the case of rapid cooling in air. Alternatively, by remelting the polymer in the dispersion medium liquid, the polymer can be cooled within the medium liquid and thereby rendered into particles.

The dispersion of the polymer particles thus prepared is maintained at a temperature at which crystallization of the polymer will progress, preferably the optimum crystallization temperature. While the crystallization temperature differs with the kind of crystalline polymer to be crystallized, the temperatures at which crystallization of the pertinent polymers can proceed are known and can be found in various references or can be readily determined beforehand by simple experiments.

The heat treatment time is the time required for the formation of the desired voids at the heat treatment temperature, which is below the melting point of the polymer. This time varies with the composition of the polymer particles. In general, the longer this time is, the better are the results, but the required minimum time decreases with the filler content. Generally speaking in the case where the polymer is polypropylene, while a time of over one hour is required in some cases where no filler is used, a time of the order of from 15 to 30 minutes is sufficient at a temperature in the vicinity of the optimum crystallization temperature which is the range of 135 to 150° C. in many cases of filler concentrations in the ordinary range.

The high-pressure region in which the heat treatment is to be carried out is maintained at a pressure above the saturated vapor pressure of the dispersion in view of the necessity of maintaining the dispersion substantially as a liquid. To facilitate the infiltration of the dispersion medium into the voids due to the volumetric shrinkage of the polymer accompanying the crystallization and, moreover, to enhance the effect of abrupt pressure release in the low-pressure region, the pressure in the high-pressure region should be as high as possible. While any suitable pressurizing method and means can be used to apply this high pressure, the introduction of nitrogen gas under pressure is probably the most convenient.

We have found that in order to produce foamed beads of uniform particle size, the temperature of the dispersion should be held below the melting point or fluidizing temperature of the polymer during the period after the heat treatment step to the succeeding foaming process step.

FOAMING

The dispersion of the polymer particles thus heat treated is ejected into a low-pressure region to cause the polymer particles to foam.

The temperature of the low-pressure region is lower than the melting point of the crystalline polymer, while the pressure of this region is lower than the saturated vapor pressure of the dispersion. While the most ordinary conditions of the low-pressure region are room temperature and atmospheric pressure, it is also possible to apply higher temperature and subatmospheric pressure to promote the evaporation of the dispersion medium inside and outside of the polymer particles.

The ejection of the dispersion from the high-pressure region to the low-pressure region may be accomplished through a nozzle of one or more orifices or extruding openings of slit shape or other shapes. The ejection velocity from the nozzle is preferably higher than the velocity of sound (330 meters/second), but a velocity of one-half sound velocity or lower may be used.

In order to indicate still more fully the nature and utility of this invention, the following examples of practice constituting preferred embodiments of the invention and results are set forth, it being understood that these examples are presented as illustrative only and that they are not intended to limit the scope of the invention.

EXAMPLE 1

To 57 parts of an isotactic polypropylene of a melt index (MI) of 4, 20 parts of a clay and 23 parts of calcium carbonate were added, and the resulting mixture was kneaded in an extruder and then extruded through the die thereof. The polymer thus extruded was rapidly cooled and pelletized. 100 parts of the pelletized polymer were dispersed in 200 parts of water containing 0.5 part of an anionic-nonionic emulsifier ("Plysurf A–212E").

The resulting dispersion was pressurized to 30 kg./cm.$_2$ in a sealed vessel and heated to 150° C. with agitation. After 40 minutes of heating at the same temperature, a discharge valve was abruptly opened to eject the dispersion into a region at atmospheric pressure through a slit nozzle of a width of 1.5 mm.

As a result, foamed structures in the form of beads ranging in shape from spheres to ellipsoids of densities of from 0.07 to 0.05 gram/cc. and having a finely foamed cellular structure therewithin were obtained.

EXAMPLE 2

To 50 parts of a liner polyethylene of a MI of 4, 10 parts of an isotactic polypropylene of a MI of 4, 25 parts of calcium carbonate, 10 parts of diatomaceous earth, and 5 parts of barium sulfate were added, and the resulting mixture was kneaded in an extruder and then extruded through the die thereof into pellets, which were rapidly cooled in water. 70 parts of these pellets were dispersed in water containing 0.8 part of an emulsifier.

The resulting dispersion was pressurized to 30 kg./cm.$^2$ in a sealed vessel and heated to 130° C. with agitation. After the dispersion was maintained at the same temperature for 45 minutes, its temperature was raised further to 130° C., and a discharge valve was abruptly opened to eject the dispersion from the high-pressure region at a pressure of 60 kg./cm.$^2$ into the low-pressure region at atmospheric pressure.

As a result, foamed beads ranging in shape from spheres to ellipsoids, similar to those of Example 1, of densities of from 0.17 to 0.09 gram/cc. were obtained.

EXAMPLE 3

70 parts of pellets prepared according to the procedure set forth in Example 1 were dispersed in 200 parts of acetone, and the resulting dispersion was pressurized to 40 kg./cm.$^2$ in a sealed vessel and subjected to the heat treatment specified in Example 1. Then, under a pressure of 65 kg./cm.$^2$, a discharge valve was abruptly opened to eject the dispersion through an orifice of 1.5 mm. diameter into a low-pressure region at atmospheric pressure.

As a result, foamed beads of spherical shape of densities of from 0.03 to 0.09 were obtained. While these beads had a uniform foamed cellular structure, a few were stretched and rendered into fiber foam.

What is claimed is:

1. A process for producing foamed beads which comprises subjecting a dispersion of particles of a crystalline olefin polymer selected from the group consisting of crystalline polyethylene and crystalline polypropylene in a dispersion medium which is substantially a non-solvent for the polymer to pressure above the saturated vapor pressure of the dispersion and a temperature lower than the melting point of the polymer but permitting crystallization of the polymer, thereby causing the dispersion medium to infiltrate into voids produced within the polymer particles due to volumetric shrinkage of the polymer particles resulting from crystallization of the polymer, thus forming a dispersion of the particles of the crystalline polymer which is foamable due to the presence of the dispersion medium in the particles, and ejecting the dispersion into a region having a pressure lower than the saturated vapor pressure of the dispersion and a temperature lower than the melting point of the polymer, thereby causing evaporation of the dispersion medium within the particles.

2. A process for producing foamed beads according to claim 1 in which said crystalline polymer contains a filler which is not mutually soluble therewith.

3. A process for producing foamed beads according to claim 2 in which said filler is in the form of a fine powder.

4. A process for producing foamed beads according to claim 2 in which said filler is a polymer kneadable with said crystalline polymer.

5. A process for producing foamed beads according to claim 1 in which said dispersion medium is water.

6. A process for producing foamed beads according to claim 1 in which said dispersion medium is an organic solvent of a boiling point not exceeding 100° C.

7. A process for producing foamed beads according to claim 1 in which the pressure of the low-pressure region is atmospheric pressure, and the temperature thereof is room temperature.

8. A process for producing foamed beads according to claim 1 in which the concentration of said crystalline polymer in said dispersion is from 5 to 70 percent by weight with respect to the weight of the dispersion.

9. A process for producing foamed beads according to claim 1 in which said polymer is selected from the group consisting of high density polyethylenes and isotactic polypropylenes.

References Cited

UNITED STATES PATENTS

| | | | |
|---|---|---|---|
| 3,324,061 | 6/1967 | Tanquary et al. | 260—2.5 N |
| 3,126,354 | 3/1964 | Day | 260—2.5 B |
| 2,893,963 | 7/1959 | Cleland et al. | 260—2.5 B |

MURRAY TILLMAN, Primary Examiner

M. FOELAK, Assistant Examiner

U.S. Cl. X.R.

260—2.5 HA, 2.5 N, 37 N, 40 R, 41 B, 41 R, 841, 847, 848, 853, 854, 857 R, 895, 897 A, 897 B, 897 C, 897 R